(12) United States Patent
Hirose et al.

(10) Patent No.: US 10,997,317 B2
(45) Date of Patent: May 4, 2021

(54) METHOD FOR SAFEGUARDING THE CONFIDENTIALITY OF THE SENDER'S IDENTIFICATION OF MESSAGES TRANSMITTED THROUGH PROMISCUOUS CHANNELS

(71) Applicant: SCOPUS SOLUCOES EM TI LTDA, Sao Paulo-SP (HR)

(72) Inventors: Adren Sassaki Hirose, Sao Paulo-SP (BR); Reginaldo Arakaki, Sao Paulo-Sp (BR); Armin Werner Mittelsdorf, Sao Paulo-Sp (BR); Wilson Vicente Ruggiero, Sao Paulo-Sp (BR)

(73) Assignee: SCOPUS SOLUCOES EM TI LTDA, Sao Paulo (BR)

( * ) Notice: Subject to any disclaimer, the term of this patent is extended or adjusted under 35 U.S.C. 154(b) by 361 days.

(21) Appl. No.: 16/071,652

(22) PCT Filed: Jan. 19, 2017

(86) PCT No.: PCT/BR2017/050009
§ 371 (c)(1),
(2) Date: Jul. 20, 2018

(87) PCT Pub. No.: WO2017/124165
PCT Pub. Date: Jul. 27, 2017

(65) Prior Publication Data
US 2019/0034661 A1    Jan. 31, 2019

(30) Foreign Application Priority Data
Jan. 20, 2016    (BR) .......................... 1020160012791

(51) Int. Cl.
*H04L 29/06* (2006.01)
*G06F 21/62* (2013.01)
(Continued)

(52) U.S. Cl.
CPC ........ *G06F 21/6254* (2013.01); *H04L 9/0836* (2013.01); *H04L 9/14* (2013.01); *H04L 63/0421* (2013.01); *H04L 63/0428* (2013.01)

(58) Field of Classification Search
CPC ..... G06F 21/6254; H04L 9/0836; H04L 9/14; H04L 63/0421; H04L 63/0407; H04L 63/0414; H04L 63/0428; H04W 12/02
See application file for complete search history.

(56) References Cited

U.S. PATENT DOCUMENTS 5,917,911 A * 6/1999 Dabbish ................ H04L 9/0836
380/277
6,684,331 B1   1/2004 Srivastava
(Continued)

OTHER PUBLICATIONS

Satyajayant Misra et al; Efficient anonymity schemes for clustered wireless sensor networks; International Journal of Sensor Networks, vol. 1 No. 1/2, Jan. 1, 2006, pp. 50-63, XP055360656.
(Continued)

*Primary Examiner* — Yogesh Paliwal
(74) *Attorney, Agent, or Firm* — Dinsmore & Shohl LLP

(57) ABSTRACT

The method allows a sender to safeguard its identification in messages sent to a recipient. Even when using promiscuous channels for transmitting the message, only the recipient is able to disclose the sender's identity. The method uses symmetrical cryptography of low computational requirements, without depending on a single shared key among the users so that the sender cannot disclose the identity of the others. The method gradually safeguards the sender's identification, by using successive symmetric cryptographic operations and keys of a binary tree structure built for this purpose in the recipient which applies the steps in a reverse way to that of the sender's protection, to disclose its identification. It is also possible to encrypt the message body.

8 Claims, 4 Drawing Sheets

(51) Int. Cl.
*H04L 9/08* (2006.01)
*H04L 9/14* (2006.01)

(56) References Cited

U.S. PATENT DOCUMENTS

2008/0010348 A1* 1/2008 Dawson ............... H04L 51/00
 709/206
2008/0086636 A1* 4/2008 Jung ................ H04L 9/0836
 713/163

OTHER PUBLICATIONS

Seyit Ahmet Camtepe et al; Key Management in Wireless Sensor Networks; Jan. 1, 2008, IOS Press, XP055360745; pp. 110-141, section 4.2; figure 4.

* cited by examiner

METHOD FOR SAFEGUARDING THE CONFIDENTIALITY OF THE SENDER'S IDENTIFICATION OF MESSAGES TRANSMITTED THROUGH PROMISCUOUS CHANNELS

This application is the U.S. national stage of PCT/BR2017/050009 filed Jan. 19, 2017, which claims priority of Brazilian Patent Application 1020160012791 filed Jan. 20, 2016 of which is hereby incorporated by reference in its entirety.

FIELD OF THE INVENTION

The present invention refers to a method for enabling a sender to protect its identification in messages which are sent to a recipient, so that even if promiscuous channels are used for their transmission, only the recipient can be able to disclose the sender's identification. The method uses a symmetric cryptography of low computational requirements, without depending on a single shared key among the possible participants, so that a sender cannot disclose the identity of the others.

BACKGROUND OF THE INVENTION

Nowadays, for the safe transmission of messages through promiscuous channels, cryptography is used to protect the contents in relation to confidentiality and integrity. Asymmetric cryptography is well suited for this task, in which the message is encrypted from the recipient's public key. However, this requires a lot of computational resources. On the other hand, symmetric cryptography requires less resources, but it requires the existence of a shared key between the sender and the recipient. The existence of a single symmetric key, shared with all possible senders and the recipient, is inappropriate, since it enables a sender to discover information from the message of another sender. It would be convenient the use of a different shared key for each sender, but the recipient will not know which key to select for the decryption of a received message if he does not know who the sender is. One possibility would be to try to decrypt the message and verify its integrity with all the existing symmetric keys in the recipient, but it would be computationally intensive and time-consuming when performed for a large number of users.

It is proposed a method for enabling the transmission of messages through promiscuous channels, with the confidentiality of the sender's identification protected by symmetric cryptography, which allows the recipient to determine, objectively, who the sender of a message is and, consequently, the corresponding keys.

SUMMARY OF THE INVENTION

In view of the above-mentioned problems, the objective of the present invention is to enable a sender to encrypt with symmetric algorithms, parts of a message containing its identification, so that the recipient can decrypt its content disclosing the sender's identifier without knowing in advance who the sender is.

According to the invention, the method comprises the steps of:
 Generating the set of keys in the recipient, wherein a tree structure of random keys is created;
 Distributing a user ID and corresponding set of keys for each possible sender;
 Constructing the open message from the concatenation of the user identifier (UID), variable field of protection against replication attacks and message body;
 Encrypting the open message, wherein the UID is progressively encrypted together with the variable field in overlapping blocks, starting at the rightmost bit of the UID and ending at the leftmost bit of the UID. The encryption of the message body is optional;
 Transmitting the message which is protected by the sender and receiving said message by the recipient;
 Decrypting the protected message using the opposite method of that one used in the encryption of the open message.

BRIEF DESCRIPTION OF THE DRAWINGS

The invention will be described below, with reference to the enclosed drawings, given by way of example of an embodiment of the invention and in which.

DESCRIPTION OF THE INVENTION

The present invention was devised for safeguarding the confidentiality of the senders' identification of messages which are sent to a specific recipient, through promiscuous channels. The sender's identity is represented by an integer named User ID or UID. The UID has its confidentiality safeguarded by a series of cryptographic operations, which is the object of the present invention. The body of the message may have its confidentiality and authenticity optionally protected by using free methods to be chosen by the implementer and may take advantage of the structure of keys provided by the present invention. In the context of this specification, "to safeguard" and "to disclose" are associated to opposite operations carried out in relation to the UID, characterized by encryption and decryption applied successively.

Figure 1:
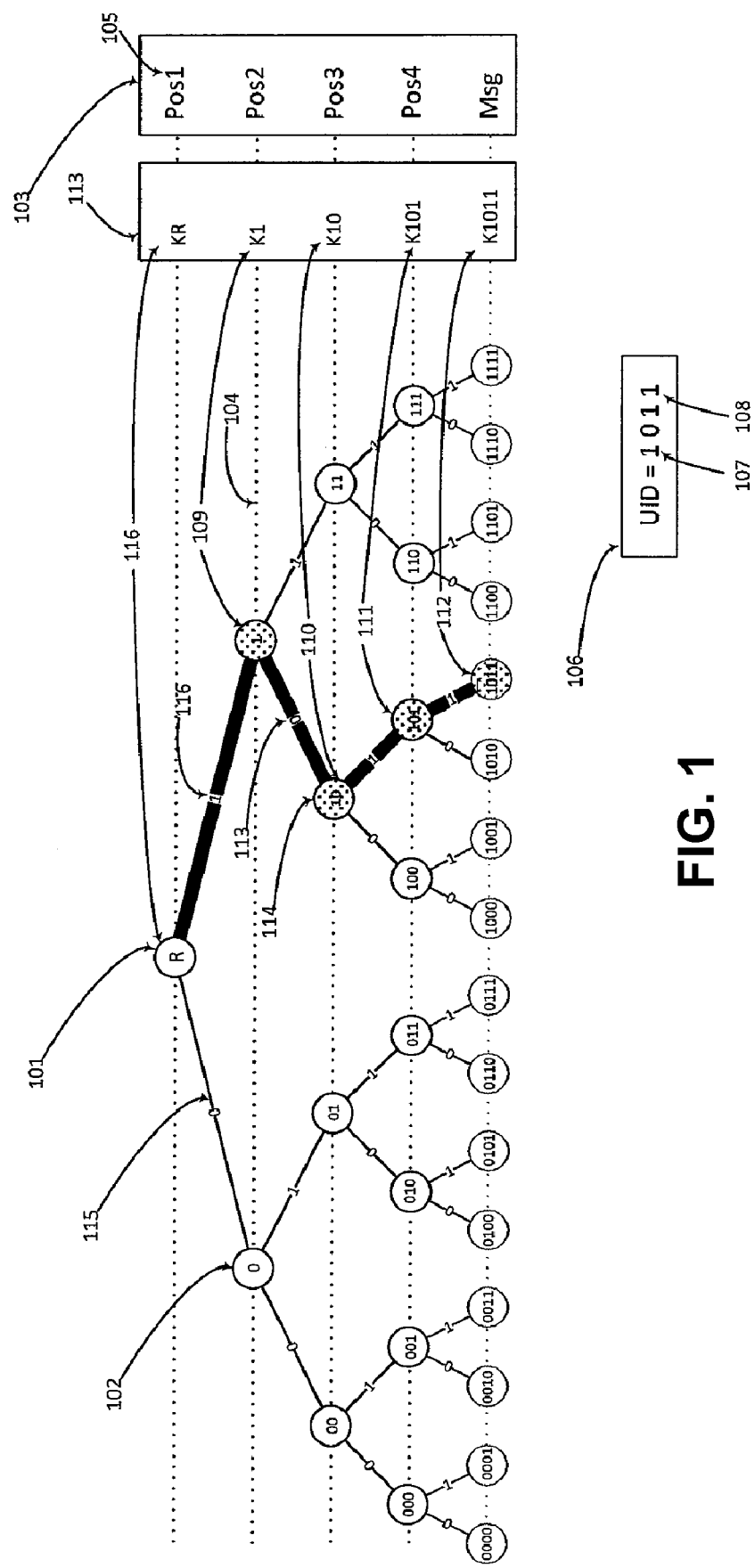
FIG. 1 illustrates a tree diagram of the random keys generated in the recipient for identification of users of a length equal to four bits.

Initially, before any message may be transmitted to the recipient, it is necessary to create the keys that will be used to encrypt the UID contained in each message. The keys are stored in a tree structure, which exists only in the recipient. First, the required number of bits is determined in order to represent the largest number of users that the system should support. For a number of 1024 users, for example, exactly 10 bits are required. This value is named length of the UID in bits or number of bits of the UID. The length of the UID should be established beforehand and should not be modified once the keys have been created. The tree that will contain the cryptographic keys of the recipient will be a binary tree of a depth equal to the number of bits of the UID. The keys of this tree are, usually, compatible with the used cryptographic algorithms. FIG. 1 shows the example of a tree used for users with UID of 4 bits length, denominated R 101. Each node of this tree 102 has an associated binary value, which increases in number of bits as the depth increases. The vertices on the right 115 refer to the addition of a bit of '0' value and those ones on the left 116, to a bit of value '1'. All the possible UIDs can be seen on the leaves. In this tree, particularly, the details for the user of UID='1011' 106 are pointed out. Next to this tree, there is the diagram of encryption/decryption 103 positions containing positions numbered according to the location where the cryptographic operation on the UID will occur as described below. The bit 107 is the leftmost bit of the UID and the bit 108 is the rightmost bit. For each position there is also a corresponding key, which is seen in the key frame 113, with the details of numbering of the sender of UID equal to '1011'. In the example of the UID 106, the leftmost bit 107 has corresponding key entitled KR, that will be used to encrypt the first position Pos1 105. The user with UID equal to '1011' has keys corresponding to Pos1, Pos2, Pos3, Pos4 and Msg, which are the same number of keys of the length of his UID in bits, plus one optional key for the message. This relationship is indicated in the positions frame 104 and in the key frame 113 of the user of UID '1011' and in the nodes of the keys tree in dotted lines 104. It is important to observe that the path in bold 113 in the keys tree, showing the progression of the hatched nodes such as node 114, representing, progressively, each one of the bits '1011' of the UID example 106.

The key corresponding to Position 1 105 is the KR key 116. The key corresponding to Position 2 is the K1 key 109. The key corresponding to Position 3 is the K10 key 110. The key corresponding to Position 4 is the K101 key 111. In due course, these keys will be used for the progressive cryptography of the UID, in the step of encryption and decryption of the UID. There is a key of optional use, K1011 112, which is responsible for the encryption of the body of the message, when this is required.

Before each sender is able to send messages to the recipient, the sender needs to receive a UID and the set of keys corresponding to said UID. This must be carried out by the recipient through a safe channel, in order not to compromise the keys. In the particular case of UID '1011', the UID '1011' and the keys KR, K1, K10, K101 and K1011 e K1011 will be transmitted.

Figure 2:
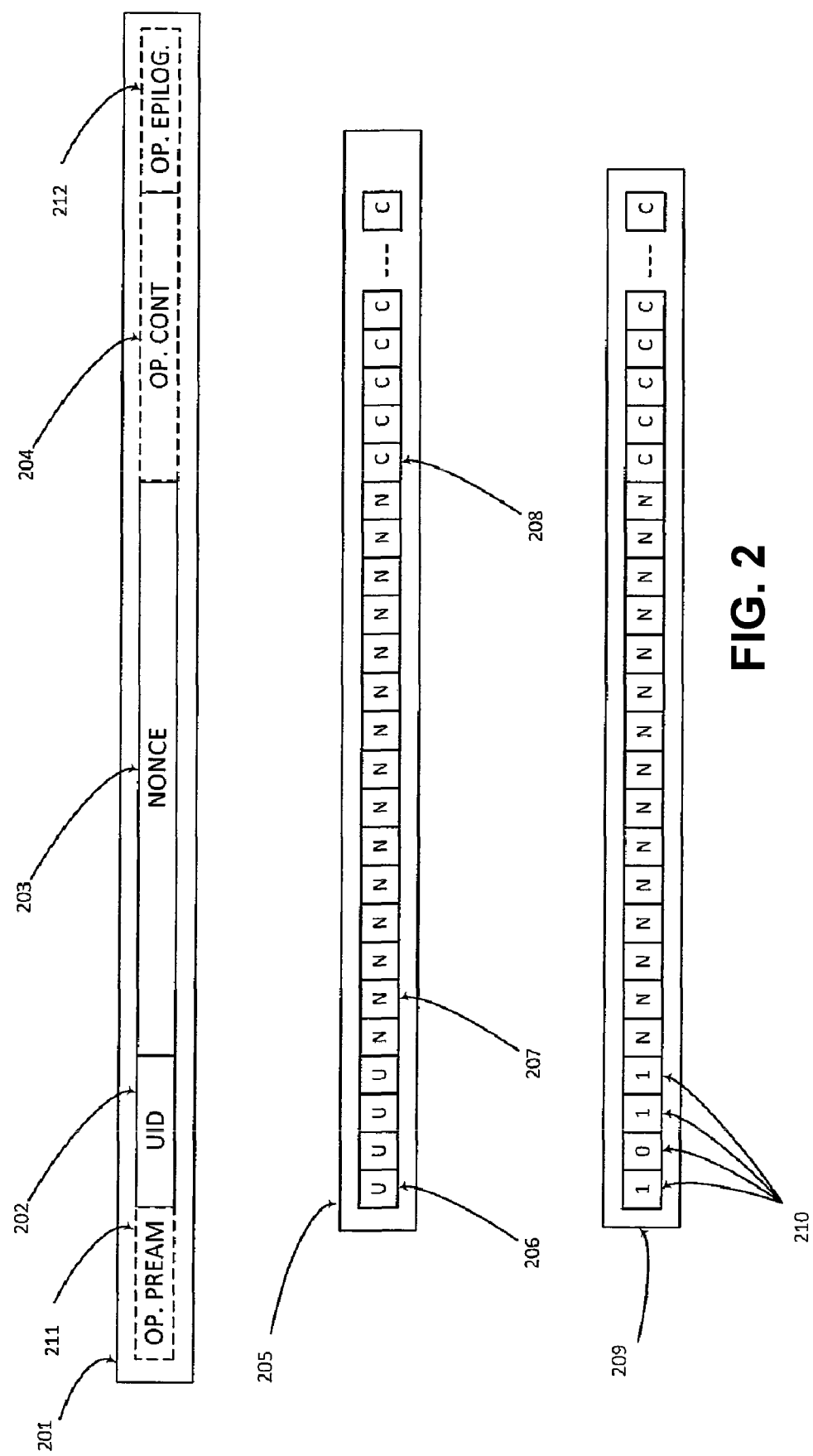
FIG. 2 illustrates the open message in three different levels of details.

The sender builds his message according to 201 at the top of FIG. 2.

The open message (201) is composed basically of the UID 202 and Nonce 203. The Nonce is a unique number and never reused, which is inserted by the sender in the message, enabling the sender to detect "replay attacks". Replay attacks are those in which an attacker intercepts a message and later sends duplicates of this message to the recipient illegitimately. Usually, messages have a message body 204 containing the information that is desired to be transmitted to the recipient. Optionally, the message may receive a preamble 211 and an epilogue 212. The preamble and the epilogue must allow the future extension of functionalities. The order of the fields is arbitrary, with the exception of the UID and Nonce, which must be adjacent. The other fields can be placed in other positions. However, once their positions are defined, they should not be further modified, in order that the recipient always finds the fields in the same position in all messages received.

The message 205 presents a four-bit UID message 'U' 206, 15 bits of Nonce 'N' 207, an indefinite quantity of bits of the message body 'C' 208, with the absence of the preamble and epilogue. In the open message 209 it can be seen the same message 205. However, with the UID bits replaced by the value '1011' 210, to serve as example. The values of the Nonce 'N' and the message body 'C' are not represented by their respective bits, since their values do not matter in the description of the method.

Figure 3A:
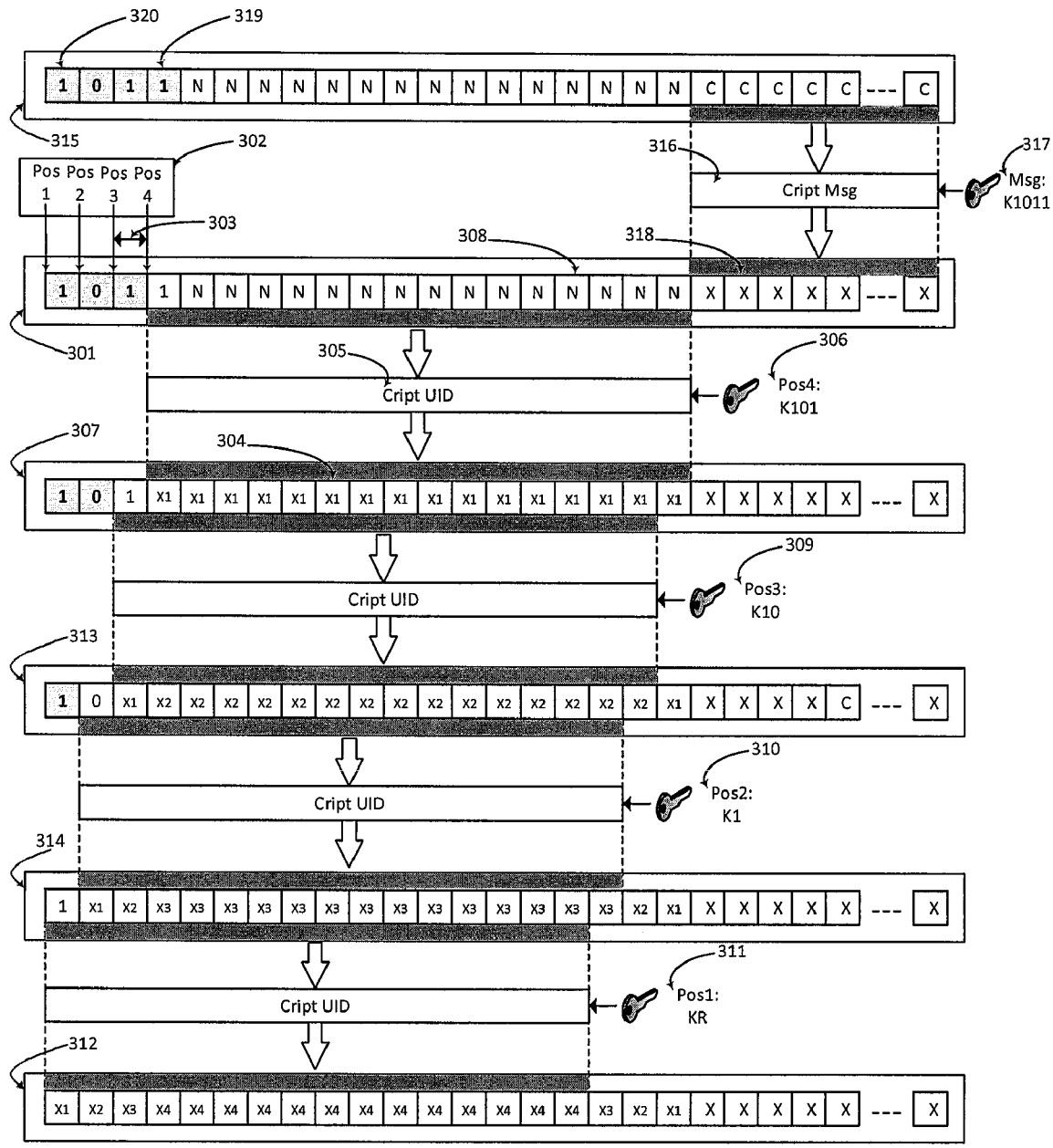
FIGS. 3A and 3B illustrate, respectively, the various steps of the encryption of the open message and decryption of the protected message.

The encryption steps of the open message are shown in FIG. 3A. For convenience, the open message 209 is reproduced in this figure at 315.

The method gradually encrypts the UID, starting at the position corresponding to the rightmost bit of the UID. The result of the encryption is reinserted in the same position of the message. The process is repeated by shifting one bit to the left, until there remains no bit of the UID to be encrypted. The keys used for encryption vary according to the position of the bit of the UID to be encrypted.

The four positions where the encryption will be employed are pointed out in frame 302. Each cryptographic operation will act both in the UID and in the Nonce 308, which are juxtaposed. The number of cryptographic operations on the UID will be equal to its size in bits. The first encryption starts at Position 4 indicated by the frame 302. Said encryption corresponds to the rightmost bit of the UID 319. The block to be encrypted extends over the Nonce until it comprises a total number of bits equivalent to the size of the block of the cryptographic algorithm 305 used. For convenience, for the illustration of FIG. 3A, 16 bits were used. However, in practice, larger blocks are used. This sequence of bits will be used as an input to the cryptographic algorithm 305 together with the key corresponding to this position, K1011 306. A simple way to identify which key from the keys tree will be used is to observe the UID bits that will not be encrypted. If the open bits are 101, the key will be K101. The result of the cryptographic operation is inserted in the same position of the open message, resulting in the message having a partially cryptographed UID 307. It should be observed that the bits already encrypted are represented by 'Xn' 304, where 'n' is the number of times the bit has been encrypted.

The next operation will initiate in Position 3 as indicated in table 302. There is a displacement of a bit to the left 303, denominated shift step. In an similar manner to what was done to position 4, one takes the non-encrypted bit further to the right of the UID and the bits further to the left of the block encrypted by the previous operation until forming a total of bits equal to the size of the cryptographic algorithm 305. The sequence of resultant bits is encrypted, but by using the key K10 309, corresponding to Position 3. The sequence of encrypted bits is inserted in the Position of the message having a partially cryptographed UID 307, resulting in a message with UID partially cryptographed 318.

According to FIG. 3, one can see that this step is repeated twice for the other UID positions still not cryptographed by using the shift to the left 303 and the corresponding keys to positions 2 310 and 1 311, resulting in the message with UID partially encrypted 314 and in the message with encrypted UID 312.

At this point the UID has safeguarded the confidentiality of entities that do not have the keys used in the above encryption steps.

This interactive process of cryptographic operations which gradually encrypts the UID can be time-consuming or consume a great deal of energy in devices with processing and battery limitations. For this reason, it is possible to restrict the quantity of cryptographic operations, decreasing the number of interactions. This is done by choosing the initial or final position in other points of the UID or increasing the step of displacement. In this case, the UID protection will be inferior to the case wherein all UID bits are encrypted, initializing in the rightmost bit and finishing in the leftmost bit and using a step equal to one bit.

In case one desires to protect only the user's identity, the message with safeguarded UID can be transmitted to the recipient by using a convenient channel. There is a variety of possible channels, in particular, those that can be used in the texting digital data, such as computer networks, wireless links, typing, modulated sounds, light, etc. In case one desires to safeguard the other fields, such as prologue, message body or epilogue, free choice methods can be chosen, according to each application.

The message body is usually safeguarded through cryptographic methods. This encryption can be applied before or after the UID safeguarding since it is independent from the UID safeguarding operations. In the example of FIG. 3A, the message body encryption is carried out before the UID protection. The key K1011 317 and an algorithm are used for encrypting the message body 316, resulting in the encrypted message 318. The cryptographic algorithm of the message body 316 is not necessarily equal to that of the UID cryptography 305. The choice of these algorithms occurs, mainly, due to the performance and capacity of the devices in which they will be carried out.

Figure 3B:
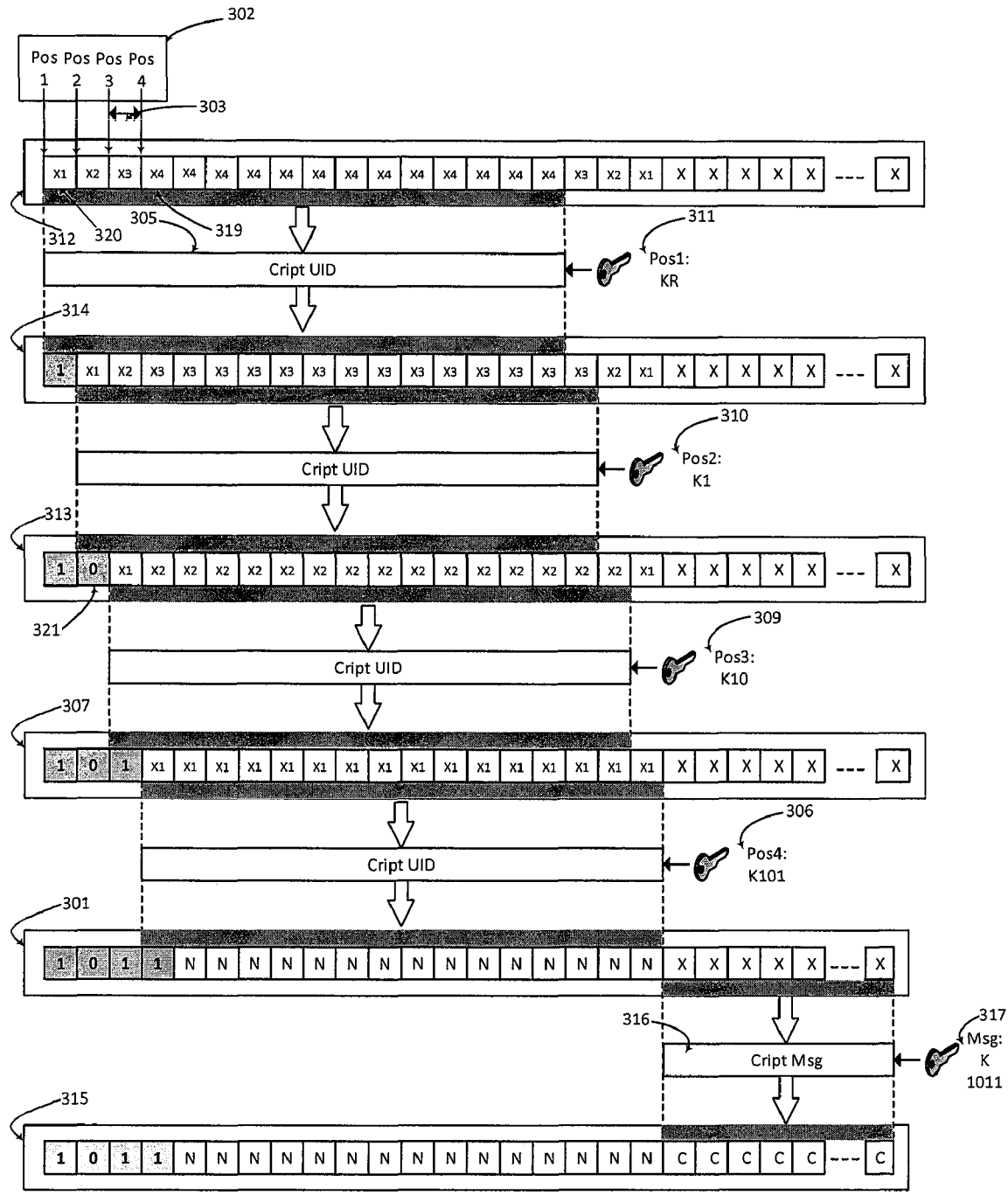

After receiving the message, the recipient should perform the operations in an inverted order to that one previously executed. This is represented in FIG. 3B. The recipient successively decrypts the message in the UID region starting from the leftmost bit. Multiple decrypting operations are executed until finalizing the rightmost bit of the UID. The same shift 303 step should be used in the UID protection of FIG. 3A, but in the opposite direction. At each decryption, a bit of the UID is disclosed. The choice of the keys is based on the UID bits already disclosed. The first key to be used is always the KR 311, since all the UID bits have been encrypted, and, consequently, there is no UID bit disclosed. After the first decryption, the first leftmost bit of UID '1' 319 is disclosed. The recipient will use as a key for the next decryption the key which index corresponds to the disclosed value '1', i.e., the key K1 310 for the next decryption step. The second decryption will disclose one more UID bit 321. The bits already disclosed of the UID are '10', also used as index of the next key K10 309. Repeating said procedure for all the positions, the whole UID will have been disclosed and the recipient will know the origin of the message. At this point, it is said that the whole UID is disclosed. Only after the total disclosure of the UID the body of the message can be decrypted, in case it has been encrypted by the sender. The key to be used in the decryption of the body of the message has an index equal to that of the UID being, thus, the key K1011 317.

The process comes to an end with the desired message opened 315.

The invention claimed is:

1. A method for generation of keys in a recipient device, the method comprising:
   creating a structure in a binary tree format having a depth equal to its length in bits of a longest User Identifier UID unknown to a recipient;
   attributing cryptographic keys to each of a plurality of nodes of the binary tree via a cryptographic algorithm used to encrypt the UID; and
   attributing different cryptographic keys for a cryptography of a body of a message to one or more leaves of the binary tree that differ from the plurality of nodes.

2. The method of claim 1, wherein a message format comprising the User Identifier followed by a value not repeated "nonce".

3. The method of claim 1, further comprising encryption of the UID via:
   defining an interactive process that initiates in a rightmost bit of the UID and finishes in a leftmost bit of the UID;
   selecting a cryptographic key which index is equal to a value of bits of the UID not yet encrypted;
   encrypting the UID and Nonce, according to a position of the interactive process; and
   repeating the interactive process using a shift step of one bit left until reaching a final position.

4. The method of claim 3, wherein initial and final positions are defined in different positions from initial and the final positions of the UID, being a step value higher than the shift of 1 bit.

5. The method of claim 1 further comprising encrypting the message body.

6. The method of claim 5 further comprising using an encryption key of the message body obtained from a node in a position corresponding to the UID.

7. The method of claim 1 further comprising decryption of the UID via:
   defining an interactive process that initiates in a leftmost bit of the UID and finishes in a rightmost bit of the UID;
   selecting a cryptographic key from keys which index is equal to the value of the bits already disclosed of the UID;
   decrypting the UID and Nonce, according to a position of the interactive process; and
   repeating the interactive process using a shift step of one bit right until the final position is reached.

8. The method of claim 7 further comprising further decrypting the message body encrypted in a sender after disclosure of the UID.

* * * * *